(12) United States Patent
Witz et al.

(10) Patent No.: US 6,516,833 B1
(45) Date of Patent: Feb. 11, 2003

(54) HELICALLY WOUND REINFORCING COMPONENTS FOR FLEXIBLE TUBULAR CONDUITS

(75) Inventors: Joel Aaron Witz, Newdigate (GB); Raymond Nicholas Burke, Bedford (GB)

(73) Assignee: University College London, London (GB)

( * ) Notice: Subject to any disclaimer, the term of this patent is extended or adjusted under 35 U.S.C. 154(b) by 0 days.

(21) Appl. No.: 09/674,450

(22) PCT Filed: Apr. 30, 1999

(86) PCT No.: PCT/GB99/01348

§ 371 (c)(1),
(2), (4) Date: Nov. 1, 2000

(87) PCT Pub. No.: WO99/57475

PCT Pub. Date: Nov. 11, 1999

(30) Foreign Application Priority Data

May 1, 1998 (GB) .............................................. 9809453

(51) Int. Cl.[7] .............................................. F16L 11/12
(52) U.S. Cl. ..................... 138/135; 138/120; 138/144; 138/129; 138/155; 138/169
(58) Field of Search ................................ 138/135, 129, 138/144, 146, 167, 169, 120, 155

(56) References Cited

U.S. PATENT DOCUMENTS

| | | | | |
|---|---|---|---|---|
| 2,354,485 A | * | 7/1944 | Slaughter ..................... | 138/129 |
| 3,173,172 A | | 3/1965 | Pasquetti | |
| 3,199,541 A | | 8/1965 | Richitelli | |
| 4,279,965 A | | 7/1981 | Elmqvist | |
| 4,493,140 A | | 1/1985 | Abdullaev et al. | |
| 4,566,496 A | * | 1/1986 | Menzel et al. .............. | 138/129 |
| 4,673,383 A | * | 6/1987 | Bentsen ....................... | 493/381 |
| 4,733,629 A | * | 3/1988 | Hunt et al. .................. | 138/129 |
| 4,869,295 A | * | 9/1989 | Keldany ....................... | 138/129 |
| 5,601,893 A | * | 2/1997 | Strassel et al. ............. | 138/120 |
| 5,660,912 A | * | 8/1997 | Menzel ........................ | 138/129 |
| 5,730,188 A | | 3/1998 | Kalman et al. | |
| 6,227,250 B1 | * | 5/2001 | Coutarel ...................... | 138/129 |

FOREIGN PATENT DOCUMENTS

DE 4212648 A1 10/1993

OTHER PUBLICATIONS

PCT International Search Report dated Jul. 30, 1999, 2 pages.

* cited by examiner

Primary Examiner—James Hook
(74) Attorney, Agent, or Firm—Moser, Patterson & Sheridan, L.L.P.

(57) ABSTRACT

This invention relates to flexible tubular conduits or pipes particularly in situations where the conduits need to withstand relatively high pressures. In such cases, the conduits are reinforced by helically wound armor which is compliant in flexure, and profiled to allow each subsequent turn to interlock with the previous turn. The invention provides a locking mechanism (8, 9) located in the axial direction of the tubular conduit comprising one or more projections (8) on one or both radial sides and a corresponding number of sockets (9) on the opposing radial sides, such that the projections (8) of one turn of the winding (10) engaging in the sockets (9) of the next turn of the winding (10), each projection (8) having an enlarged head portion (11) connected to a body by a narrow neck portion (12), and each socket having a corresponding shape to hold the projection captive in the socket, the sockets (8) and projections (9) having dimensions to allow a limited relative rotation between the adjacent turns of the winding and to resist separation, closing, and relative radial movement of the respective turns.

19 Claims, 18 Drawing Sheets

FIG. 3.
A 
B 
C 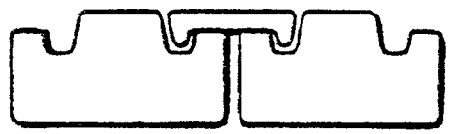
D 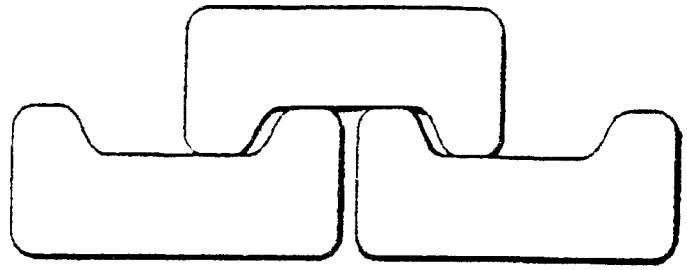

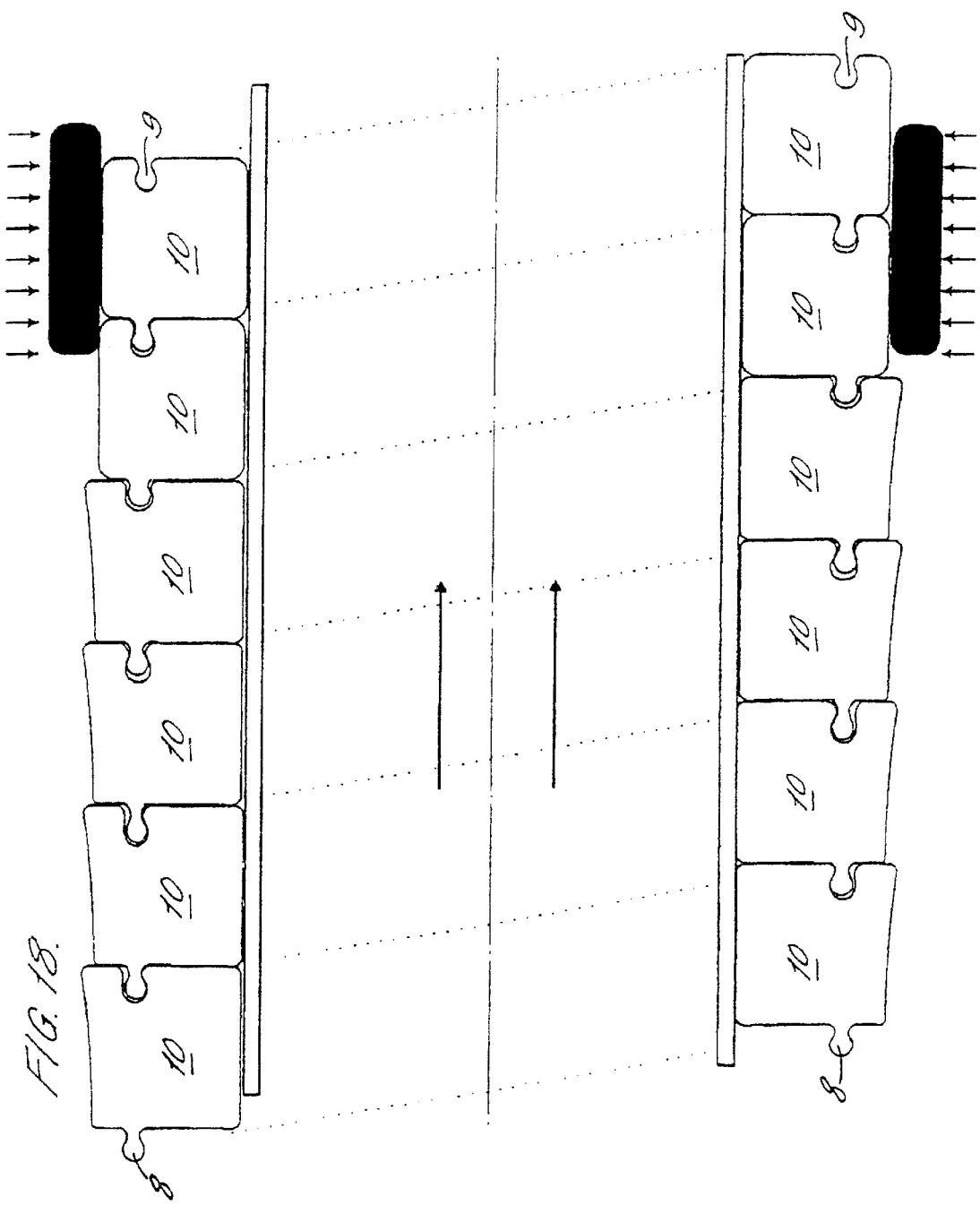

HELICALLY WOUND REINFORCING COMPONENTS FOR FLEXIBLE TUBULAR CONDUITS

This invention relates to flexible tubular conduits or pipes, particularly in situations where the conduit needs to withstand relatively high pressures (typically greater than $50 \times 10^5$ N/m$^2$). In such cases, the conduits are reinforced by helically wound armour which is compliant in flexure, and profiled to allow each subsequent turn to interlock with the previous turn. Generally, the armour is formed from steel or composite strip.

An example of this type of tubular conduit is un-bonded flexible pipe, used in the recovery of offshore hydrocarbon deposits. FIG. 1 is a schematic illustration of several arrangements of such pipe in use in various dynamic configurations, in which the pipe is being used to connect a sub-sea well to a floating platform. These are the "free hanging" (A), "Steep S" (B), "Lazy S" (C), "Steep Wave" (D), and "Lazy Wave" (E) configurations. Flexible pipes may also be used in static applications (not shown) to connect sub-sea wells to, for example, a manifold, or to tie wells which are several kilometers distant to an existing sub-sea infrastructure. There are of course other applications in addition to the offshore applications mentioned here.

An illustration of a flexible conduit, typically used in offshore applications, is shown in FIG. 2. It can be seen that successive layers are used, each layer designed to perform a particular function. The innermost layer 1 is usually an interlocking carcass that resists collapse due to external pressure. This is manufactured from a flat strip which is bent into an appropriate shape. The next layer is an inner polymer barrier 2, which is a fluid retention layer, and seals the well fluids inside the pipe. This is surrounded by an interlocked pressure armour 3 which is designed to resist internal pressure loading. Supported by an (optional) flat profiled spiral armour 4, the interlocked pressure armour 3 has a shallow helical angle and acts in the manner of hoops around a barrel. A variety of pressure armour 3 profiles exist in the public domain for use in such offshore applications, some of which are shown in FIG. 3.

The function fulfilled by the layers 1–4 are the subjects of the invention described herein. The remaining outer layers 5, 6, and 7, of the pipe shown in FIG. 2, are tensile armour wires designed to support axial load, and polymer layers used to prevent wear, or water ingress in the case of the outermost layer 7.

Flexible pipe manufacture is carried out using a sequence of continuous processes. First, the carcass layer 1 is manufactured for the entire pipe length, which may be as much as several kilometers long. Then, the polymer sealing layer(s) 2 is/are extruded onto the carcass layer 1 and cooled. A polymer tape may also be used in the application of this layer. The pipe is then fed into a winding machine, which is used to apply the armour layer(s) 3 and 4. This sequence of alternate polymer extrusions (and/or tape laying) and armour winding is continued until the fill pipe structure is built.

The profiled strips making up the armour layers 3 and 4, are currently manufactured using a wire-drawing process. Strips are produced with a cross-sectional profile consisting of a sequence of lines and arcs. The outer armour layer 4 is generally rectangular in cross section. In contrast, there are a number of, albeit limited, profiles currently available for the inner pressure armour 3, some of which are shown in FIG. 3. These are the "Carcass" (A), "Zee" (B), "Tee" (C) and "Cee" (D) profiles, and have been the subject of several published patent applications including W092/00481, W092/02751, and W091/00467. Of these, the Z~shape (B) and the C~shape (D) are most commonly used in current offshore flexible pipes.

For all such profiles in the public domain, the cross-sectional area distribution is currently designed to make the normal second moment of area substantially more than the second moment of area in the bi-normal direction. Typically, the bi-normal second moment of area is currently less than 20% of the normal second moment of area. The terms "normal" and bi-normal" refer to axes particular to the geometry of a helix, and are described in FIG. 4. In this figure, where $OX_3$ is the pipe axis and $OX_1$ and $OX_2$ are the radial directions, A is the normal (radial) axis, B is the bi-normal (axial) axis and C is the tangential axis of the helix; $\alpha°$ is the helical angle. The application of this helical geometry to a C-shape profile is shown in FIG. 5. The bi-normal second moment of area, $I_B$, is taken about axis B, and the normal second moment of area, $I_N$, is taken about axis N. Profiles with such area distributions have limited stress capacity in the radial directions.

In addition to resisting the pressure loading, the structural integrity of the conduit or pipe is maintained by interlocking subsequent turns of pressure armour, for example in the manner shown in FIG. 3. This mechanism must be applicable to a continuous assembly process during pipe manufacture and, in use, must allow some axial movement and flexural rotation of the structure whilst, at the same time, preventing the existence of excessive gaps in the pressure armour 3.

For the pressure armour layer 3, the primary mode of loading is the internal pressure of the fluids flowing, or contained within, the pipe. A second load is applied to the structure in flexure (seen locally as tension or compression in the layer), while axial tension and external pressure are additional loads. It has been established by the inventors that up to 90% of the internal pressure load is dissipated in this pressure armour layer 3. The stress expected in the layer, as a result of the functional loading, may be calculated and maximum limits set for a safe design. For flexible pipe in offshore applications, these stress limits are currently dictated by the American Petroleum Institute (API) specification 17J. A substantial reduction in the stresses developed in the pressure armour is the benchmark test that has been used to assess the improvements in the pressure armour layer(s) of this invention. A similar criterion is used to judge the carcass layer 1, which resists external pressure and prevents collapse of the pipe due to hydrostatic pressure.

The existing profiles, some of which are shown in FIG. 3, have reached their technical hard point, or limit of utility. The pressure capability of a given thickness of these armour profiles, for the range of materials typically used, is not sufficient to meet the intense demands of many applications, such as the high temperature and increasingly high pressure offshore environments. Furthermore, concerns about fretting and fatigue means that the connection mechanisms currently employed by these profiles needs to be revised. This is because the point of contact between the turns is also the location of maximum stress in all loading; flexure, tension, and pressure. Furthermore, the existing profiles have substantial gaps (of the order 1–3 mm) between subsequent turns, which are undesirable. To address these concerns, and to enable higher pressure ratings and/or deeper water capability, as well as possible weight reduction benefits, several original profiled components have been developed for such tubular conduits.

Accordingly, the present invention provides a flexible tubular conduit having a reinforced wall structure comprising at least one component wound helically, the component comprising a body having one or more projections on one or both radial sides and a corresponding number of sockets on the opposing radial sides, the projections of one turn of the winding engaging in the sockets of the next turn of the winding, each projection having an enlarged head portion connected to the body by a narrow neck portion, and each socket having an enlarged portion to receive the head portion of the corresponding projection and a narrow opening on which the neck engages to hold the projection captive in the socket, the sockets and projections having dimensions to allow a limited relative rotation between the adjacent turns of the winding and to resist separation, closing, and relative radial movement of the respective turns.

The capacity of the component to support high stress situations is partially dependent upon the relative area distributions of the numerous elements which make up the component, and increases as the relative area defined by the projection is reduced. Therefore, in one embodiment of the invention, the cross sectional area of each projection is substantially less than the cross sectional area of the component body excluding the area of each projection. Preferably, the cross sectional area of each projection should be less than 50% of the cross sectional area of the component body excluding the area of each projection. More preferably, the cross sectional area of each projection is less than 40% of the cross sectional area of the component excluding the area of each projection. More preferably still, the cross sectional area of each projection is less than 30% of the cross sectional area of the component body excluding the area of each projection. Advantageously, the cross sectional area of each projection is preferably less than 20% of the cross sectional area of the component body excluding the area of each projection. Preferably, the cross sectional area of each projection is less than 10% of the cross sectional area of the component body excluding the area of each projection.

Excess reinforcement within the component only adds weight to the tubular conduit, and does not provide any substantial increase in structural capacity when resisting the action of external pressure. Accordingly, the helically wound components would preferably comprise one or more fully enclosed internal cavities, separate to the socket recesses.

By definition, a given force applied over a small area produces a higher pressure than the same force applied over a larger area. Advantageously, in another embodiment of the invention, the axial compression forces between adjacent turns of the winding are substantially transmitted through contact between radial sides of the component body, and not through contact between projection and socket. Accordingly, the length of the projection measured from its root, on one radial side of the body, may be substantially shorter than the depth of the corresponding socket, measured from the opposing radial side of the body.

In another embodiment of the invention, the socket recess is configured to resist radial opening of the recess. Specifically, the socket recess may be reinforced by sufficient surrounding material to resist radial opening of the recess.

In a further embodiment of the invention, the tubular conduit is configured to operate at pressures of greater than $5 \times 10^5$ N/m$^2$. Preferably, the tubular conduit is configured to operate at pressures of greater than $10 \times 10^5$ N/m$^2$. More preferably, the tubular conduit is configured to operate at pressures of greater than $100 \times 10^5$ N/m$^2$. More preferably still, the tubular conduit is configured to operate at pressures of greater than $200 \times 10^5$ N/m$^2$.

In a further embodiment still, at least one projection and the corresponding socket of the component are located at a position closer to the radially outer surface of the component than the radially inner surface. Thus, these projections would be located at a position where they would be subject to a reduced stress.

In another embodiment, the component is characterised by a cross-section whose second moment of area about the bi-normal (axial) direction is at least 20%,the second moment of area of the cross section about the normal (radial) direction. Specifically, the component is characterised by a cross section whose second moment of area about the bi-normal (axial) direction is at least two thirds of, if not greater than, the second moment of area of the cross section about the normal (radial) direction. Thus, the pressure capability of the component, and thus the tubular conduit, to resist radial forces is increased.

Preferably, the narrow opening of the socket is defined by opposing curved walls, and the projection has a corresponding curved neck to engage with the curved walls and thus allows relative rotation whilst avoiding singular point contact.

Conveniently, the head portion of the projection of the component has a substantially circular profile in cross-section, and the socket has a corresponding circular profile to engage with the circular head portion and to allow relative rotation between the projection and the socket, with the avoidance of singular point contact.

In another embodiment of the invention, the component has one or more additional sockets or projections located in a surface facing radially inward and engaging with one or more corresponding projections or sockets on a second inwardly located helically wound component, thereby to locate the inner winding with respect to the outer winding and transmit radial forces, and resist relative axial sliding forces between the windings, whilst allowing some rotation of the inner winding with respect to the outer winding. Thus, the two components cooperate with each other to minimise the stress experienced by each individual component.

Preferably, the or each additional sockets or projections of the first component are positioned at a central location on the radially inwardly facing surface of the body. Thus, the stress at each of the radially inwardly facing edges is minimised.

Preferably, the helically wound inner component comprises a body having curved contours on two radially extending surfaces, such that adjacent turns of the winding co-operate with each other to remain substantially together under conduit flexure.

Advantageously, the component forming the inner winding is characterised by a cross-section whose second moment of area about the bi-normal (axial) direction is at least 20%,the second moment of area of the cross section about the normal (radial) direction. Specifically, the component forming the inner winding is characterised by a cross-section whose second moment of area about the bi-normal (axial) direction is at least two thirds of, if not greater than, the second moment of area of the cross-section about the normal (radial) direction. Thus, the inner winding is better capable to resist radial forces.

Preferably, the component forming the inner winding comprises one or more fully enclosed internal cavities.

Preferably, the or each additional projection comprises one or more flat headed portions connected to the body by linearly inclined edges. Preferably, the or each additional projection comprises one or more flat headed portions connected to the body by curved surfaces. Conveniently, the or each additional projection may be rectangular in shape. Alternatively, the or each additional projection may be semicircular in shape.

Preferably, the or each additional projections comprises an enlarged head portion connected to the body by a narrow neck portion, and the or each additional sockets has an enlarged portion to receive the head portion of the projections and a narrow opening on which the neck engages to hold the projections captive in the sockets, the additional sockets and projections having dimensions to allow a limited relative rotation between the adjacent inner and outer windings and to resist separation, closing, and relative radial movement of the respective windings.

Preferably, the reinforced wall structure of the conduit comprises at least one tubular braid located to provide additional axial tensile capacity to the conduit. Preferably, the tubular braid is manufactured from polymeric or textile materials including Kevlar™ fibres.

Advantageously, one or more of the helically wound components may be manufactured from ferrous metals, including stainless steels. Preferably, one or more of the helically wound components are manufactured from high strength steels.

Alternatively, the helically wound components may be manufactured from non-ferrous metals. Specifically, the helically wound components may be manufactured from aluminum and its alloys. Alternatively, the helically wound components may be manufactured from non-metallic materials. Alternatively, the helically wound components may be manufactured from composite materials.

Preferably, one or more of the helically wound components may be applied with heat treatments to improve mechanical properties prior to construction of the conduit.

Advantageously, a polymeric or elastomeric sealing layer is located on one or more surfaces substantially circumferential to the axis of symmetry of the flexible tubular conduit.

Advantageously, the projections and/or sockets are coated with a lubricating material. Specifically, the projections and/or sockets may be coated with a lubricating material, such as oils, waxes, greases or graphite.

Preferably, the projections and/or sockets contain one or more surface recesses. Conveniently, specifically shaped strips may be inserted into these surface recesses, or onto the surfaces of projections or sockets.

Preferably, the projections and/or sockets are coated with a sealing material, such as heavy hydrocarbons, including bitumen.

Preferably, the projections and/or sockets are coated with a polymeric material for the purposes of lubrication and/or sealing. Preferably, the projections and/or sockets are coated with a polymeric material, such as glass filled P.T.F.E, for the purposes of lubrication and/or sealing.

Preferably, the projections and/or sockets are coated with a elastomeric material, such as polychloroprene, commonly known as Neoprene, for the purposes of sealing.

In a further embodiment, each turn of the component is connected to an adjacent turn using a method of continuously linking the turns, by using the steps of applying pressure in a direction so as to force the projections into the adjacent sockets, followed by pressure in a farther direction to substantially close the sockets onto the projections resulting in plastic deformation of at least the region around the socket, and providing compressive stresses in the component. Preferably, heated rollers are used to apply pressure.

A particular advantage of the invention is that, unlike existing technology, the locking mechanism located in the axial direction gives the flexibility to change area distributions of the profiled elements, and thus is not reliant upon scaling a profile up or down.

The invention will now be described in detail, by way of example only, with reference to the accompanying drawings in which:

FIGS. 3A to 3D show a variety of existing profiles for the armour layers 3 of FIG. 2;

Figure 6:
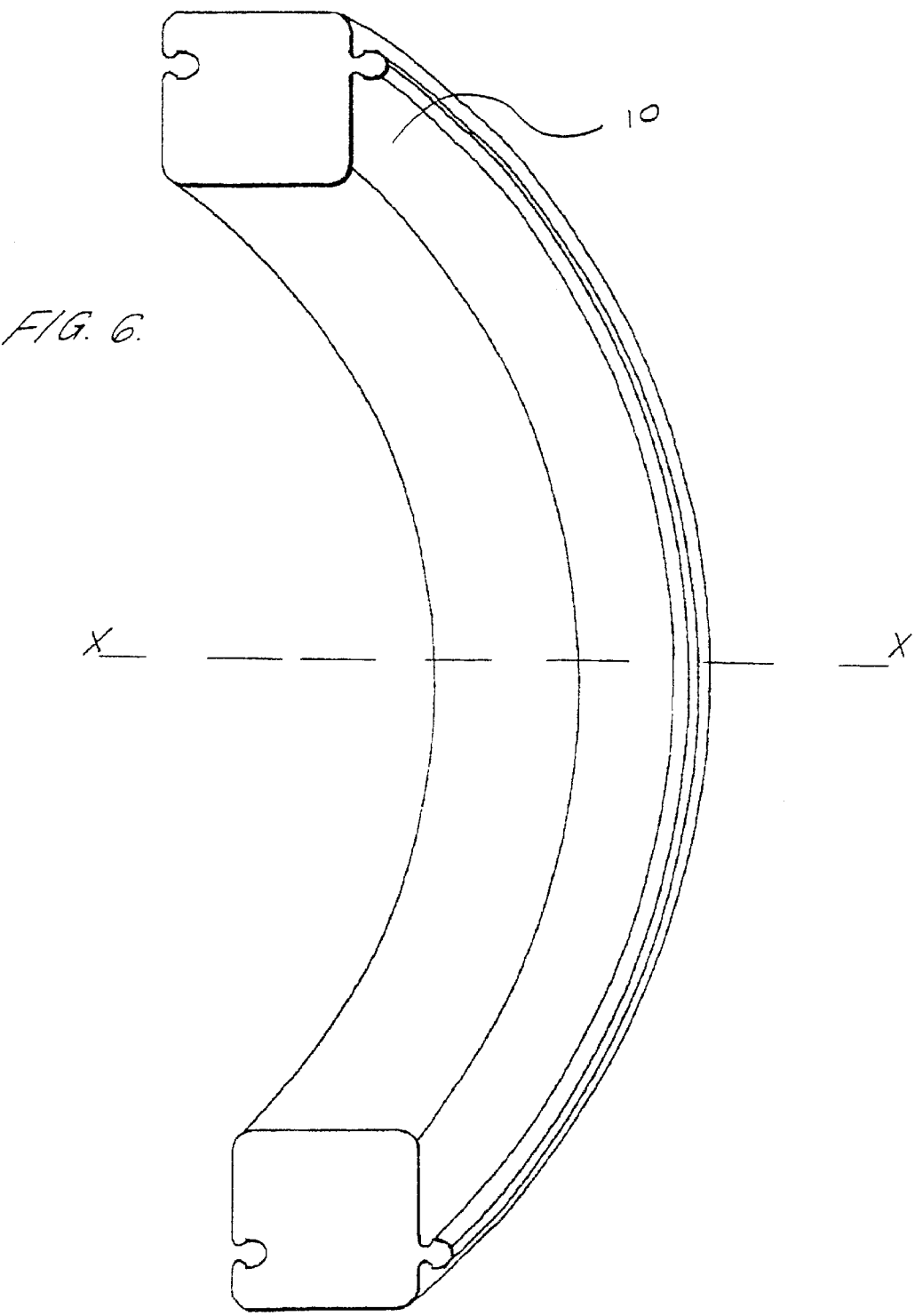
Figure 7:
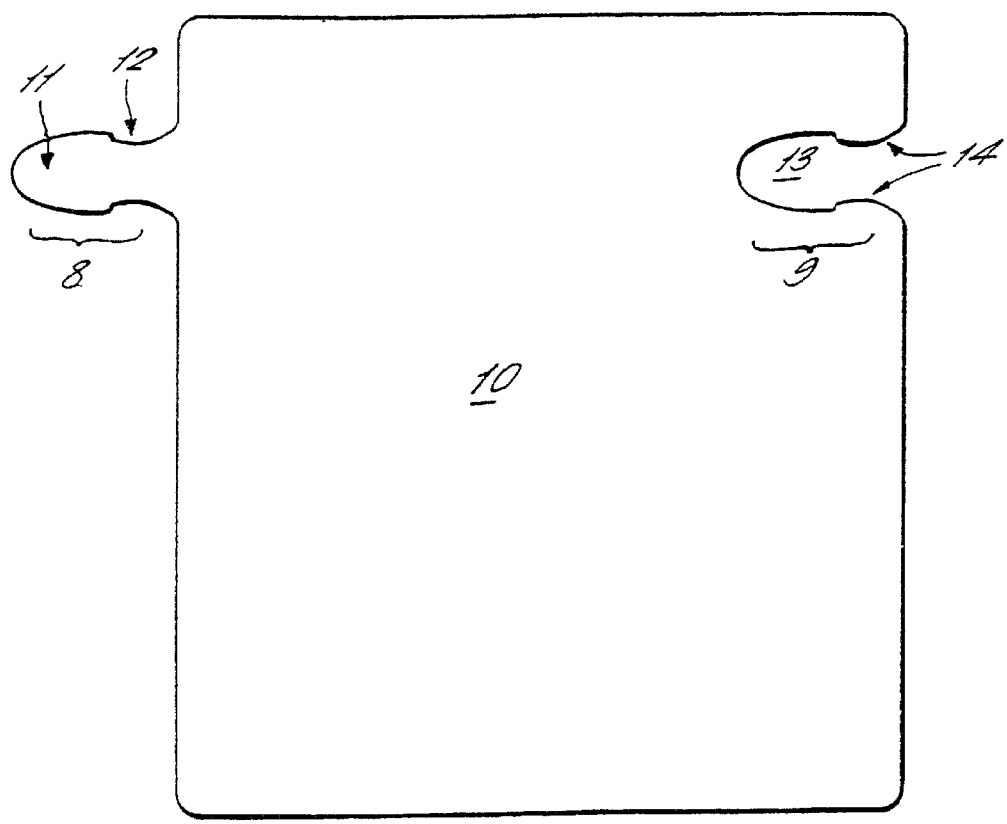
Figure 8:
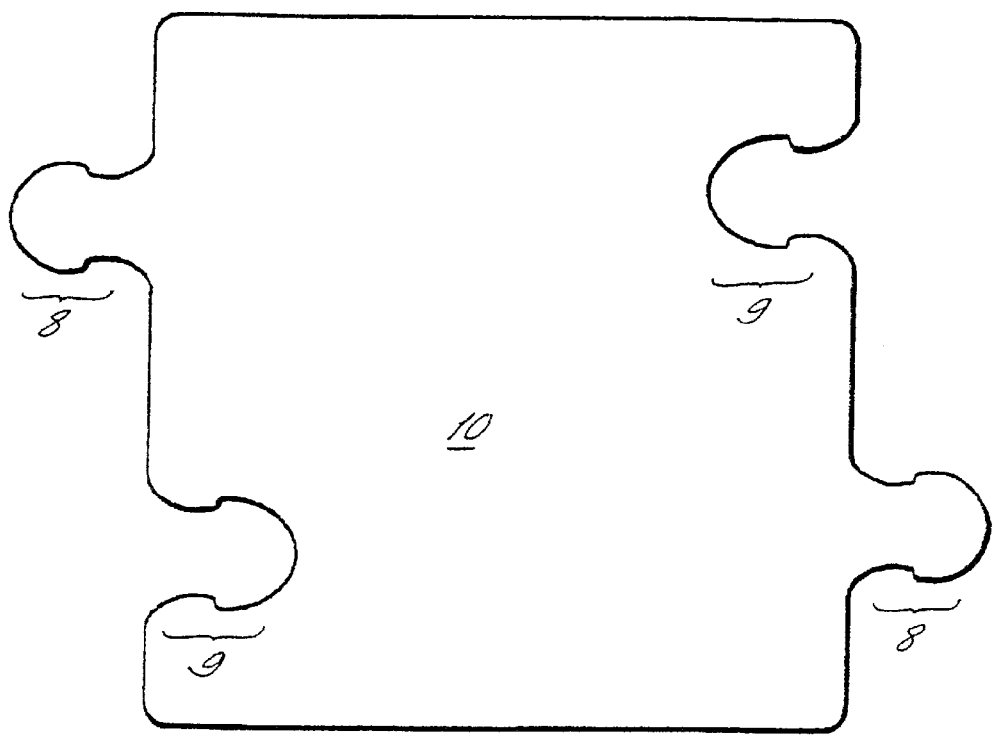
Figure 9:
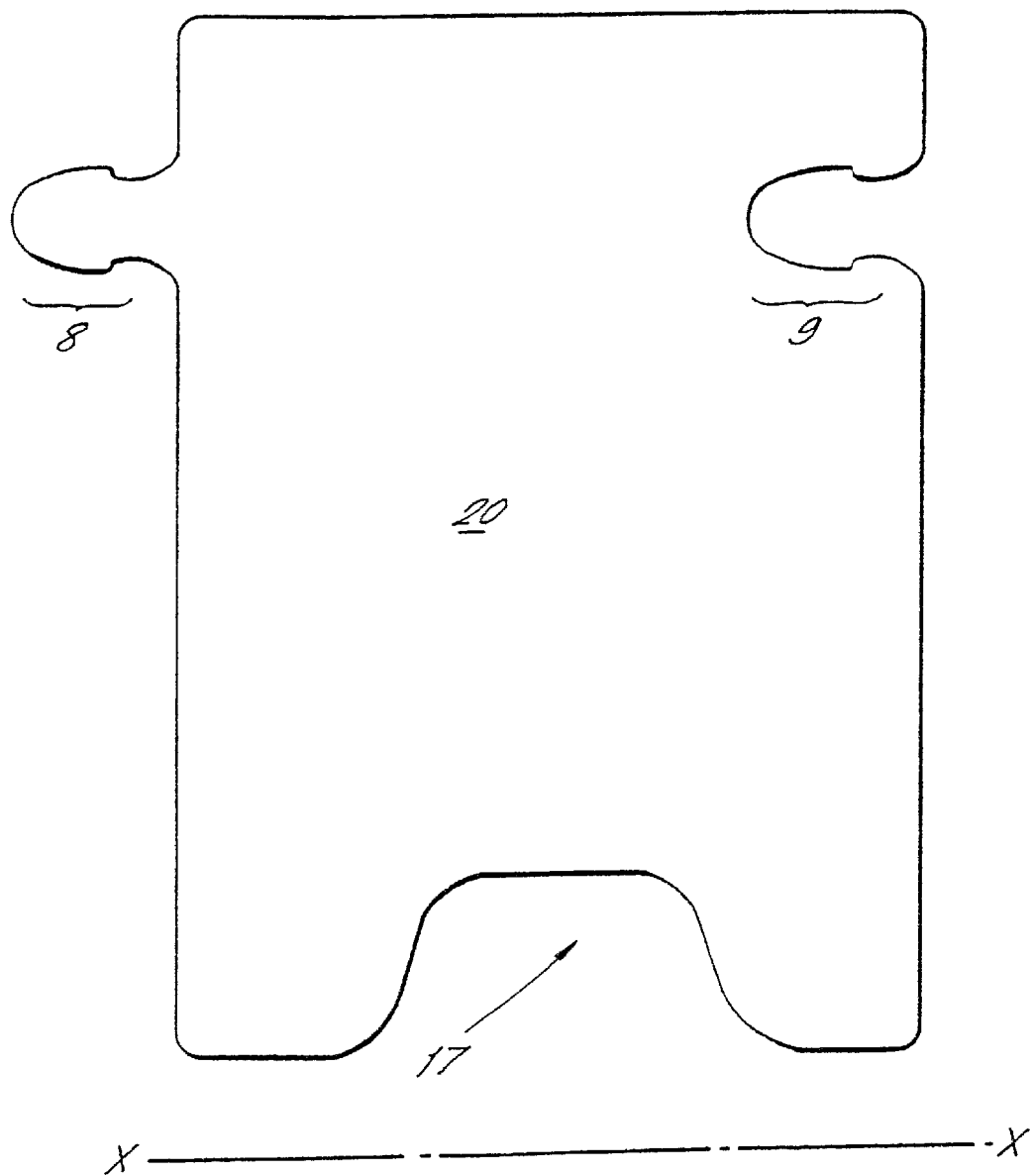
Figure 10:
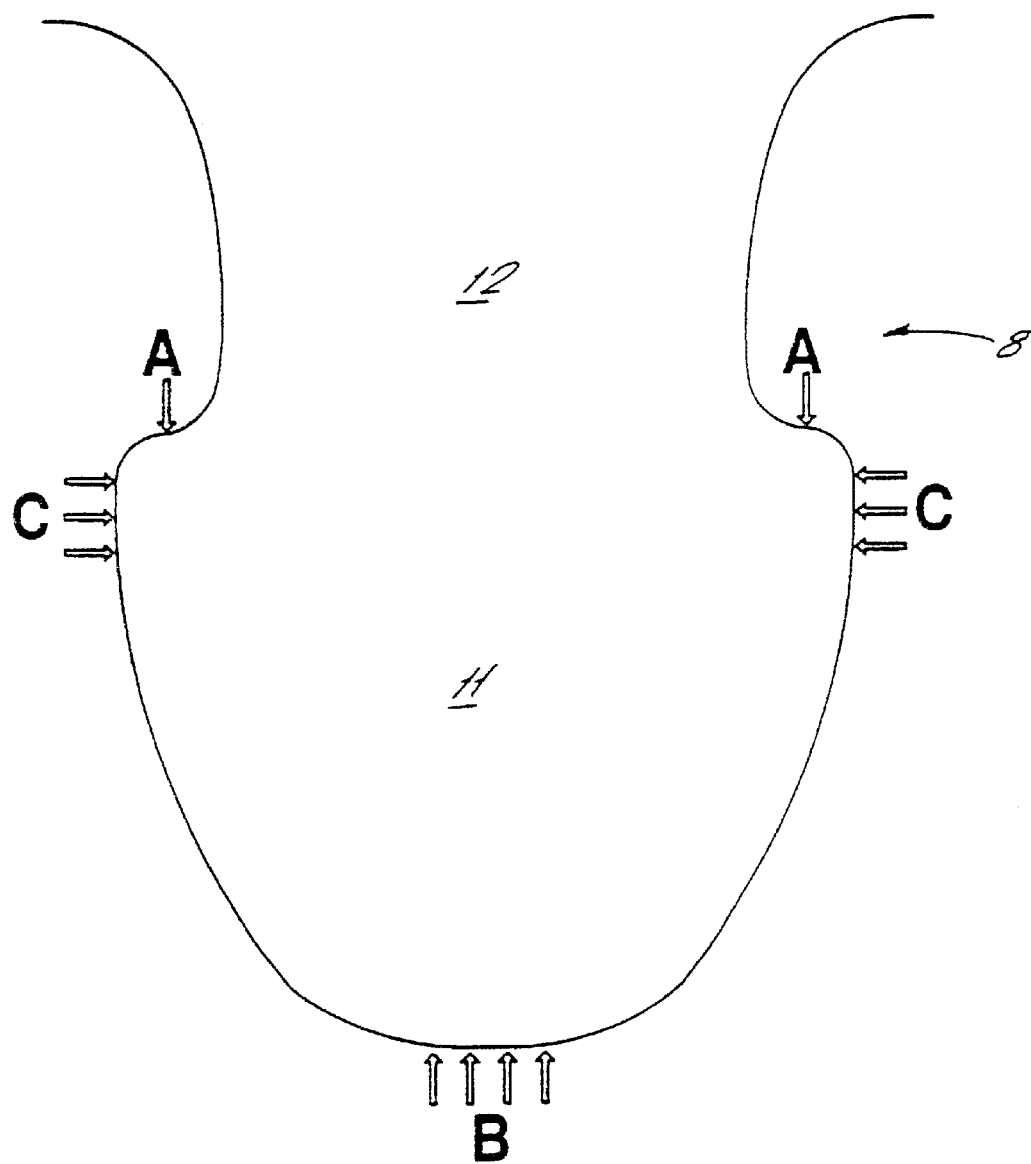
Figure 11:
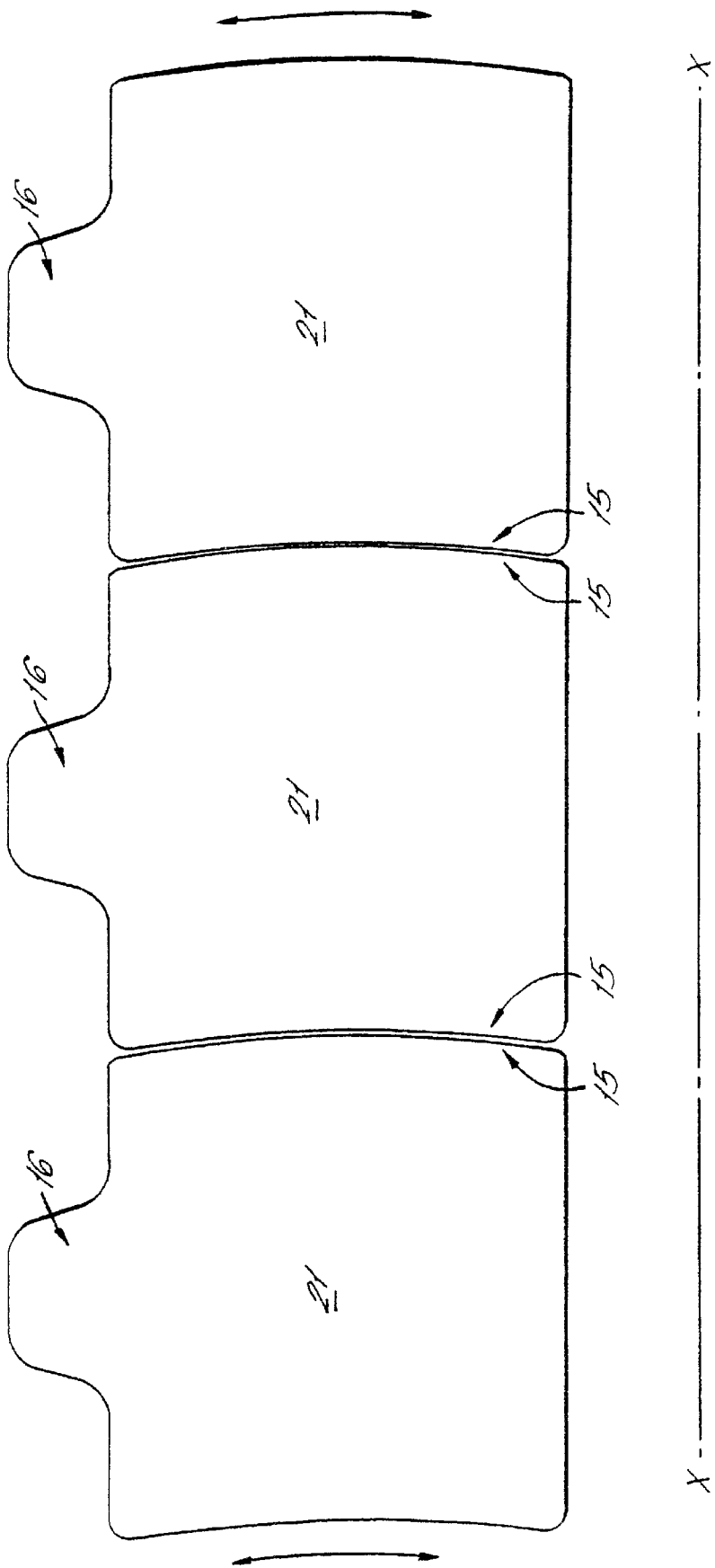
Figure 12:
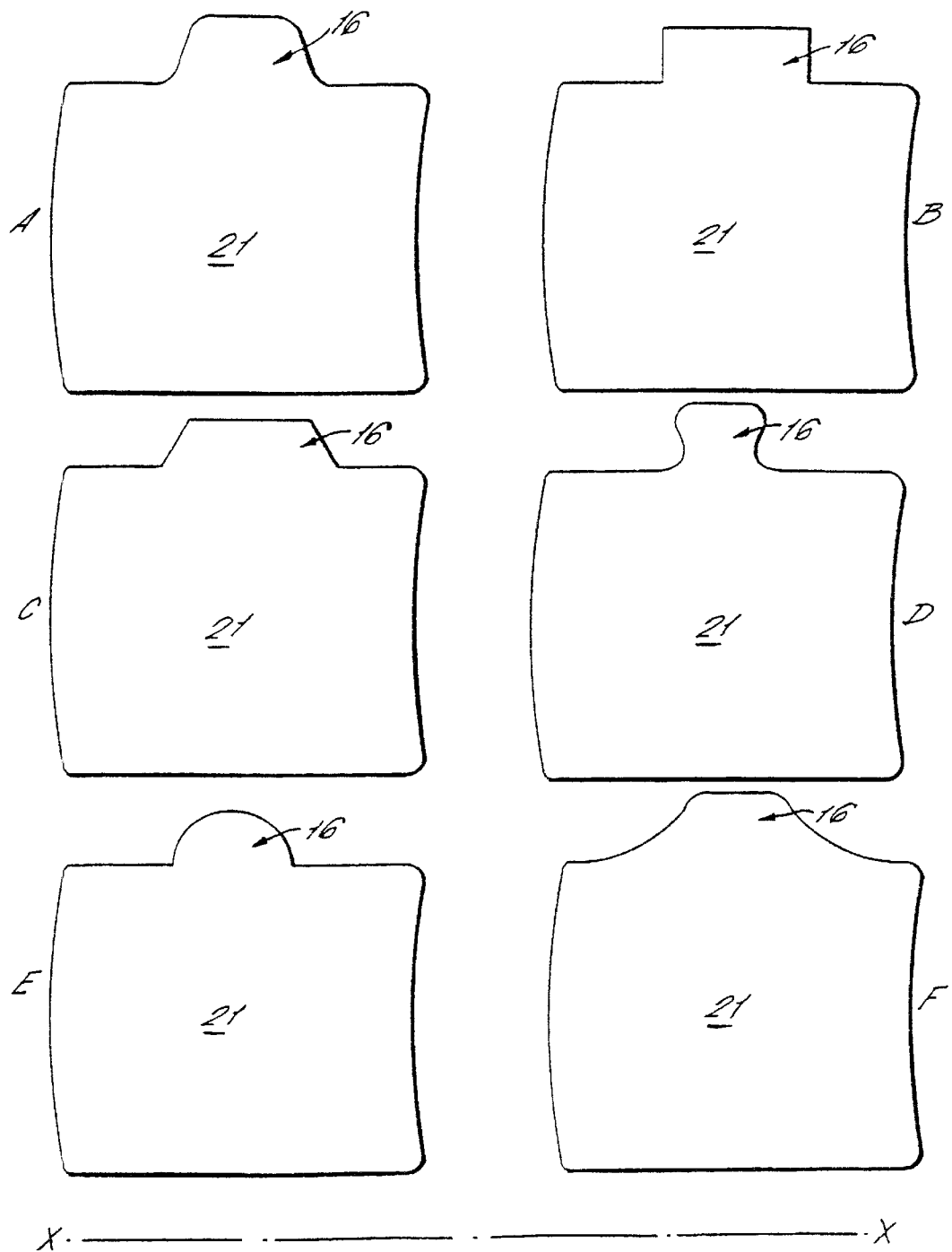
Figure 13:
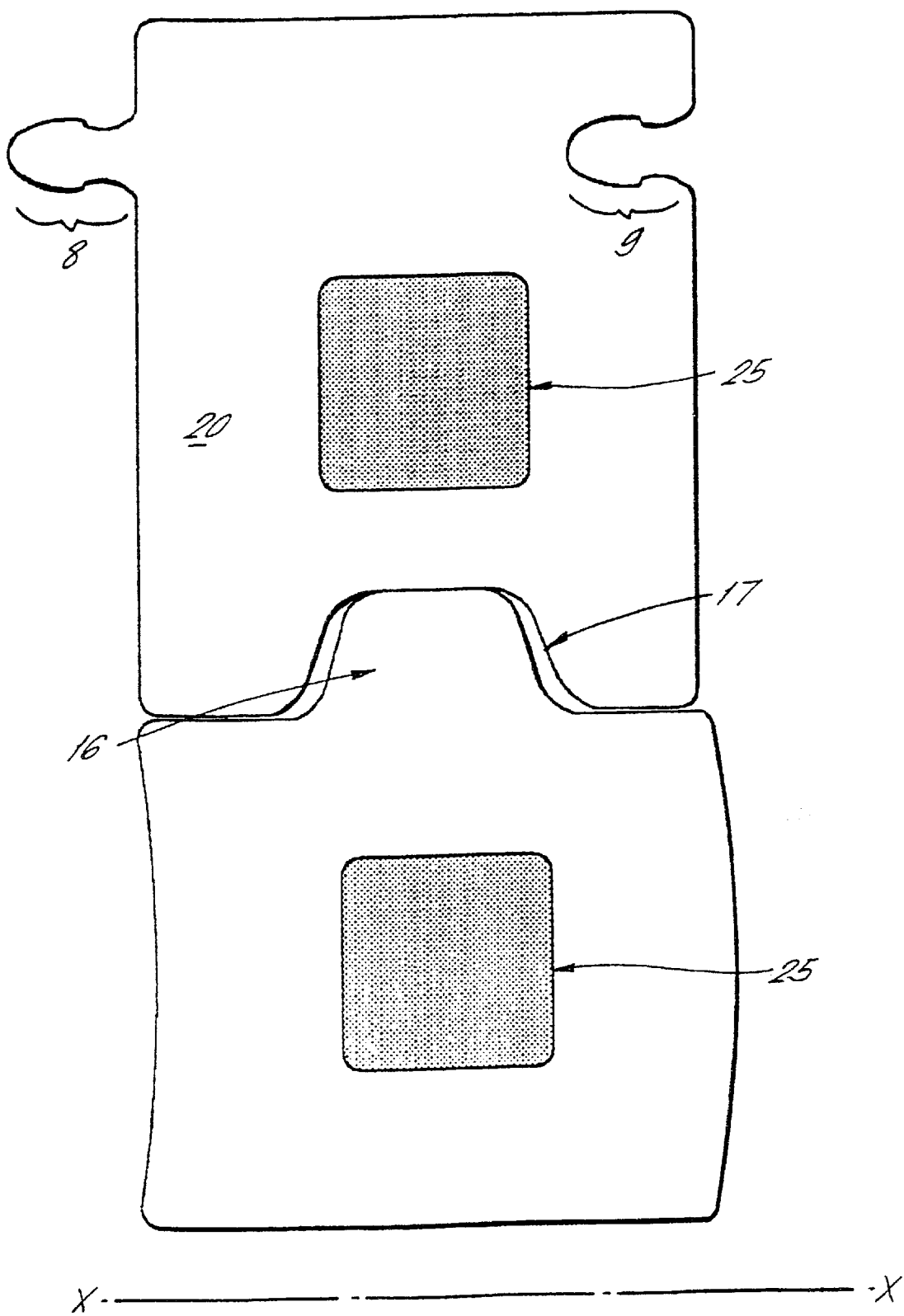
Figure 14:
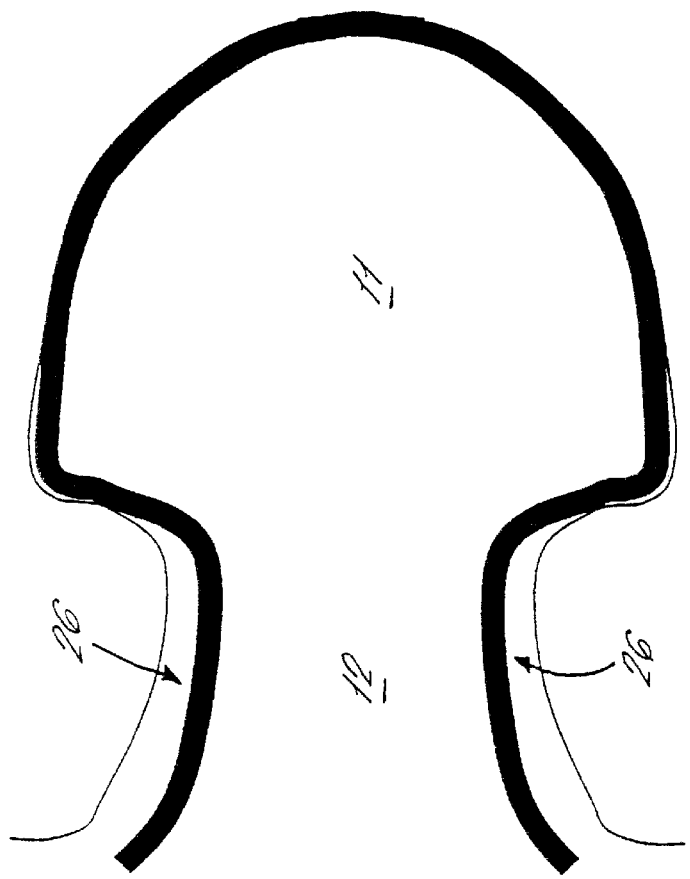
Figure 15:
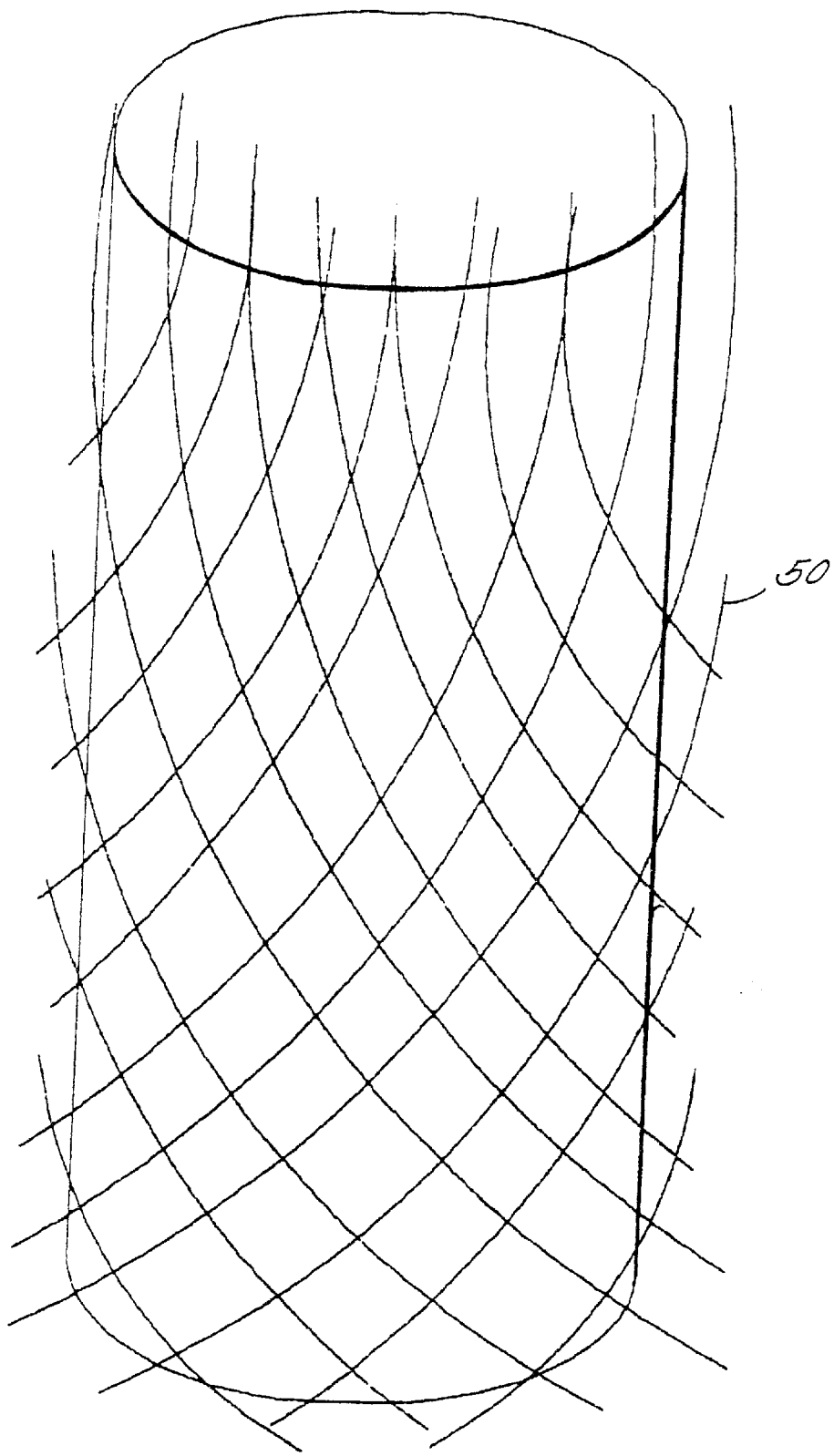

The following figures shows various embodiments of the present invention in which X—X represents the orientation of the axis of symmetry of the flexible tubular conduit:

FIG. 6 shows a helically wound component in which a cut has been made in a vertical plane of the winding;

FIG. 7 shows, in detail, the cross-sectional profile of the component of FIG. 6;

FIG. 8 shows a further embodiment of the component of FIG. 7;

FIG. 9 shows a component cross-sectional profile in which the component is an outer winding capable of engaging with the inner winding of FIG. 11;

FIG. 10 shows a component projection in detail, and illustrates that the various forces are de-coupled and act at different locations;

FIG. 11 shows several component cross-sectional profiles in which the component is an inner winding capable of engaging with the outer winding of FIG. 9;

FIG. 12 shows some possible variations in the component cross-sectional profile of the inner winding of FIG. 11;

FIG. 13 shows, in cross-section, an inner and outer winding in the engaged position. Fully enclosed internal cavities are also shown;

FIG. 14 shows a component projection in detail coated by a sealing or lubricating layer;

FIG. 15 shows a reinforcing tubular braid which may be applied to one or more surfaces of the flexible tubular conduit.

Figure 16:
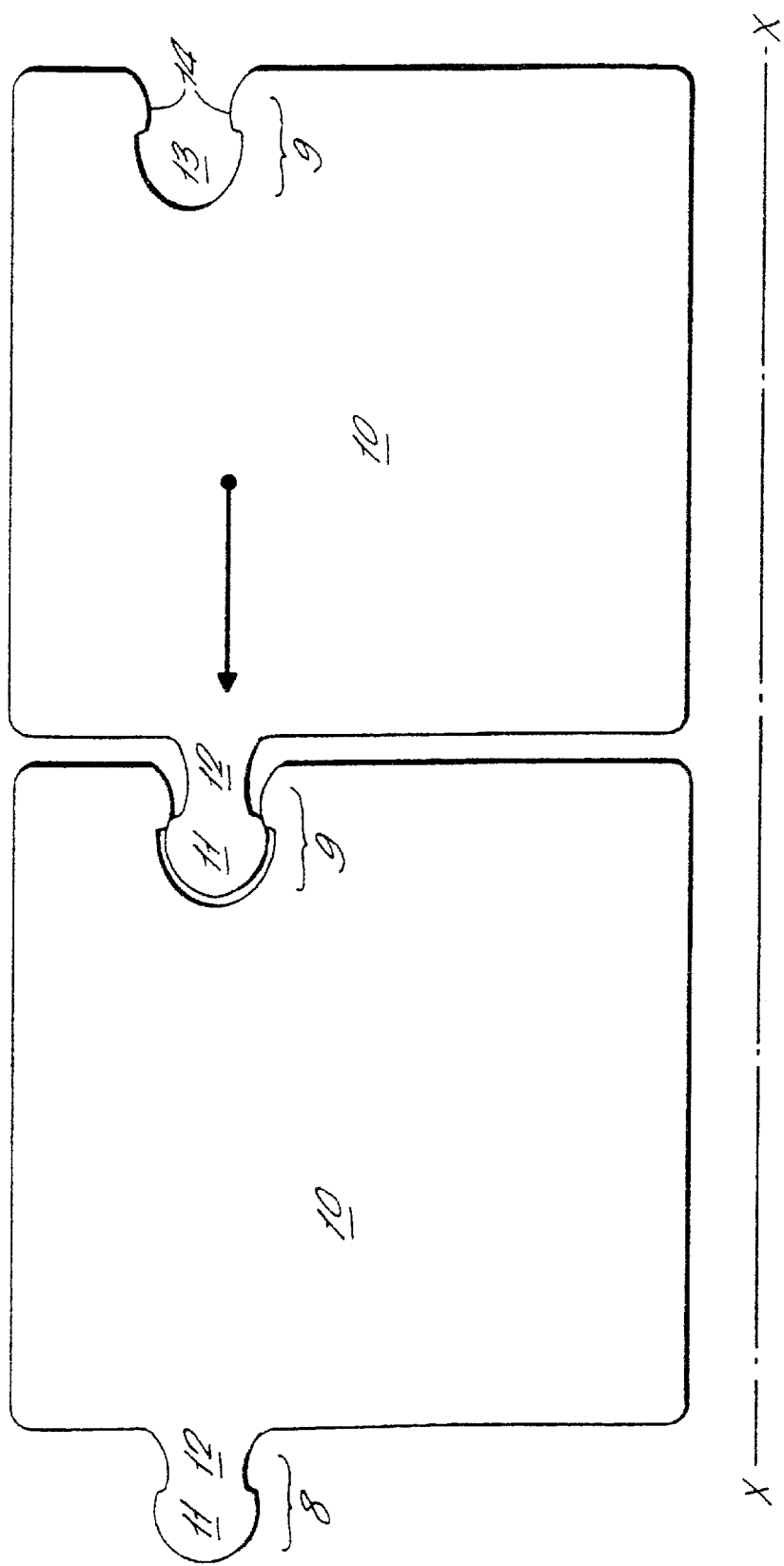
Figure 17:
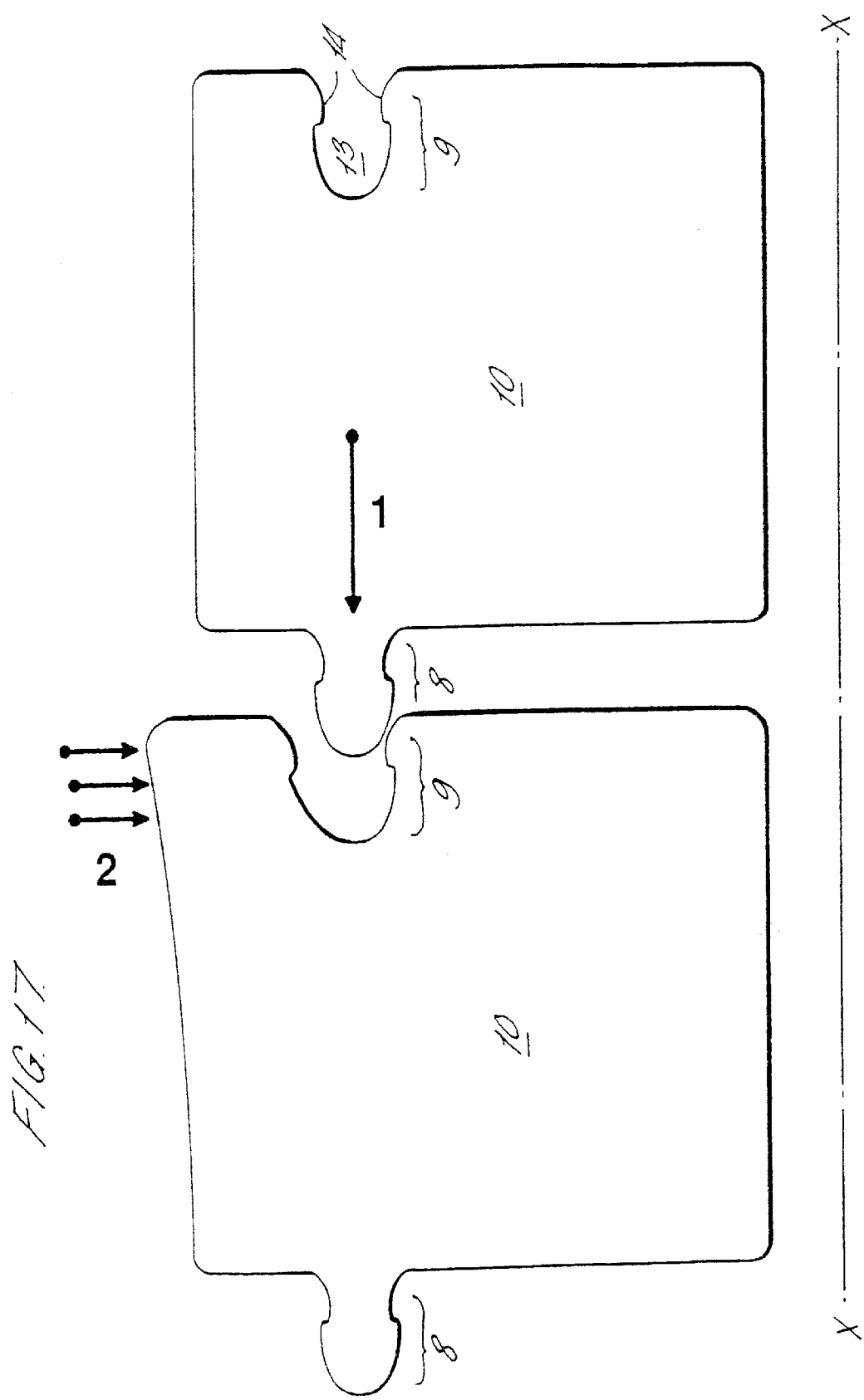

FIGS. 16–18 illustrate a method of assembling the windings.

As described above, FIGS. 1–5 illustrate examples of the prior art and, as discussed previously, current practice uses either one or two superimposed layers of internal pressure armour (layers 3 and 4 of FIG. 2 i.e. referred to as inner and outer windings respectively). Both of these configurations have been considered using the present invention. Generally, in the following discussion, the situation where the single armour layer 3 is used will be described (FIGS. 6–8) in detail prior to describing the embodiments in which the two pressure armours 3 and 4 are used (FIGS. 9, 11 and 12). The present invention is also suitable for use as the carcass layer 1.

Figure 1:
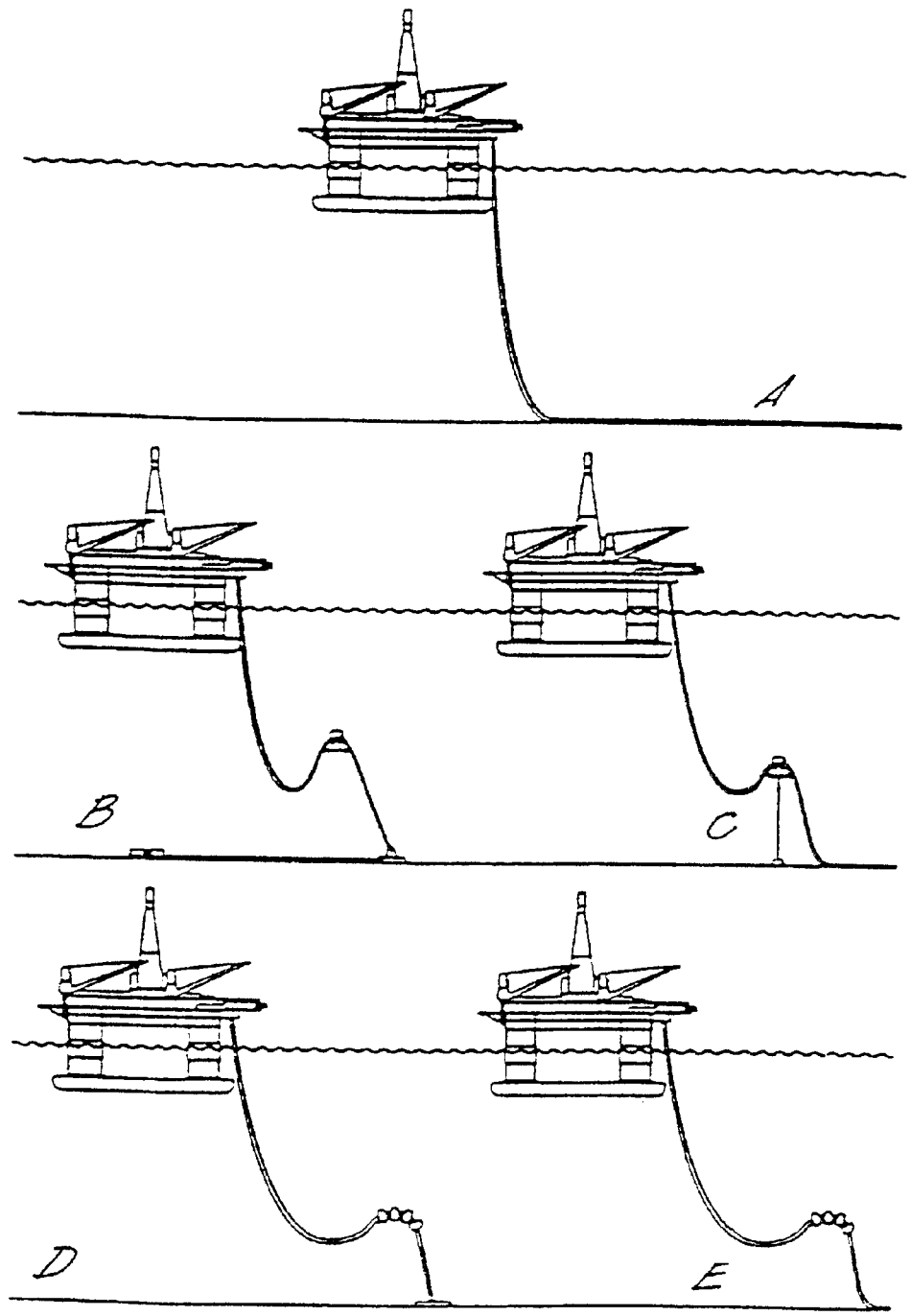
FIGS. 1A to 1E is a schematic illustration of several examples of flexible pipe utilisation.
Figure 2:
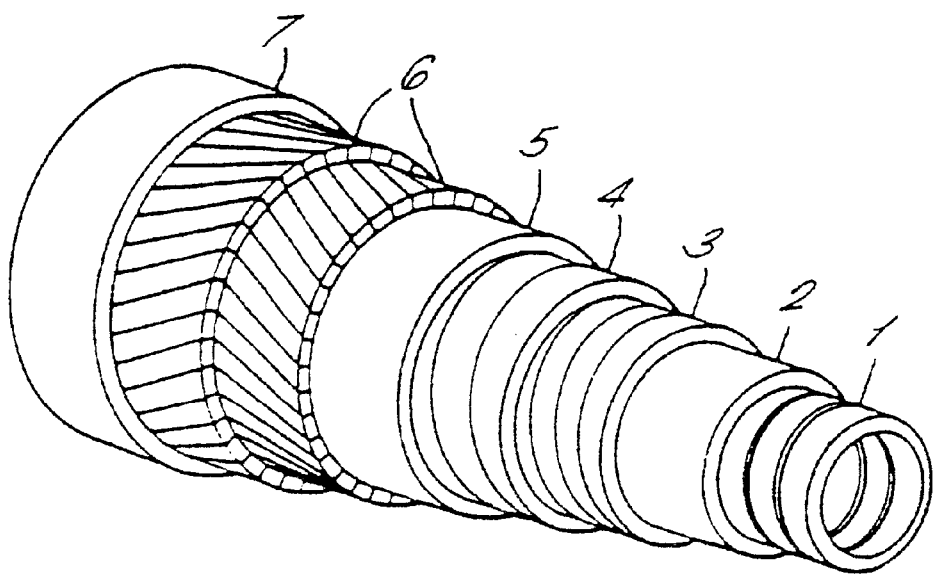
FIG. 2 shows a sectional representation of a prior art flexible pipe.
Figure 4:
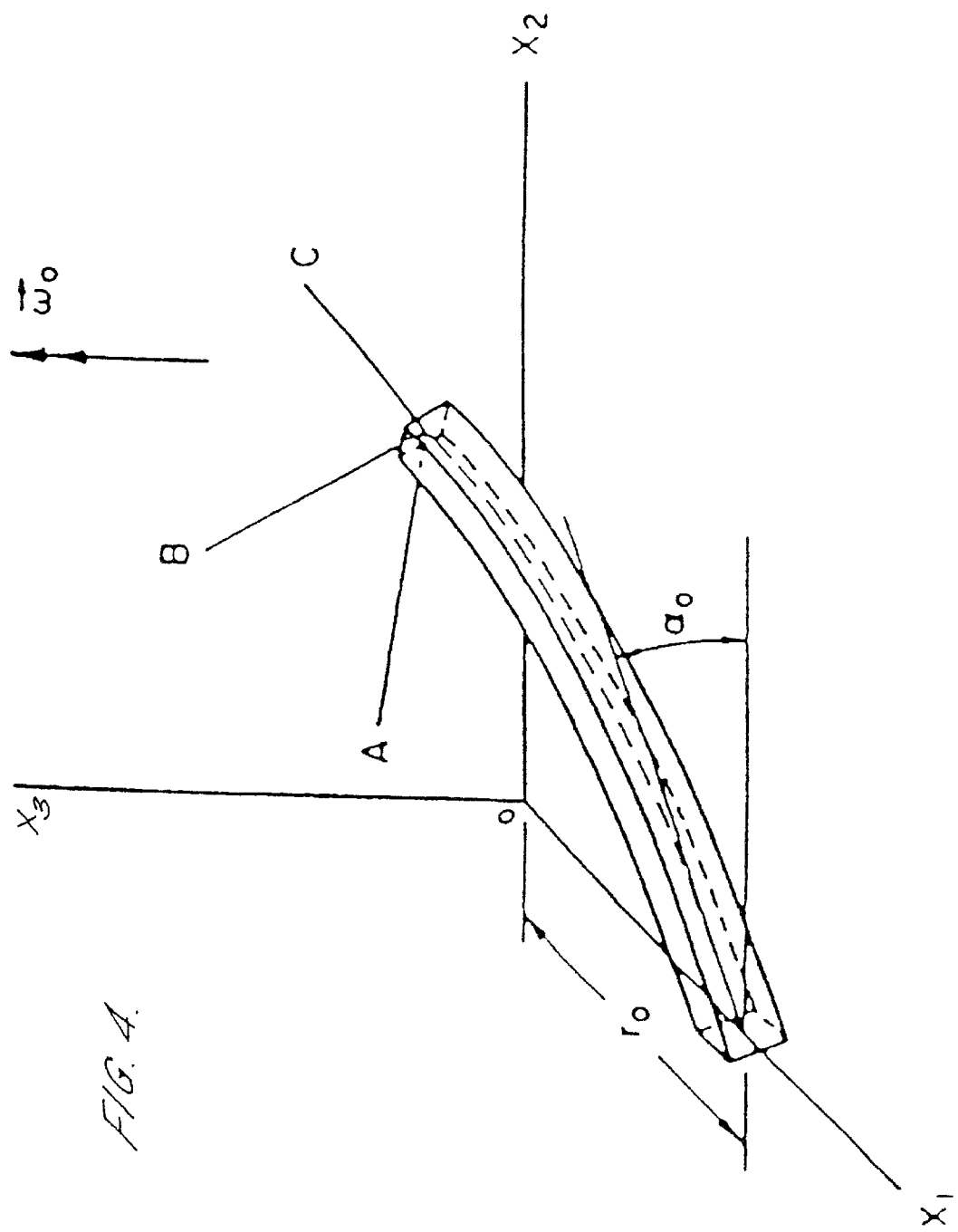
FIG. 4 illustrates the normal, bi-normal and tangential axes with respect to the axis of symmetry of a pipe.
Figure 5:
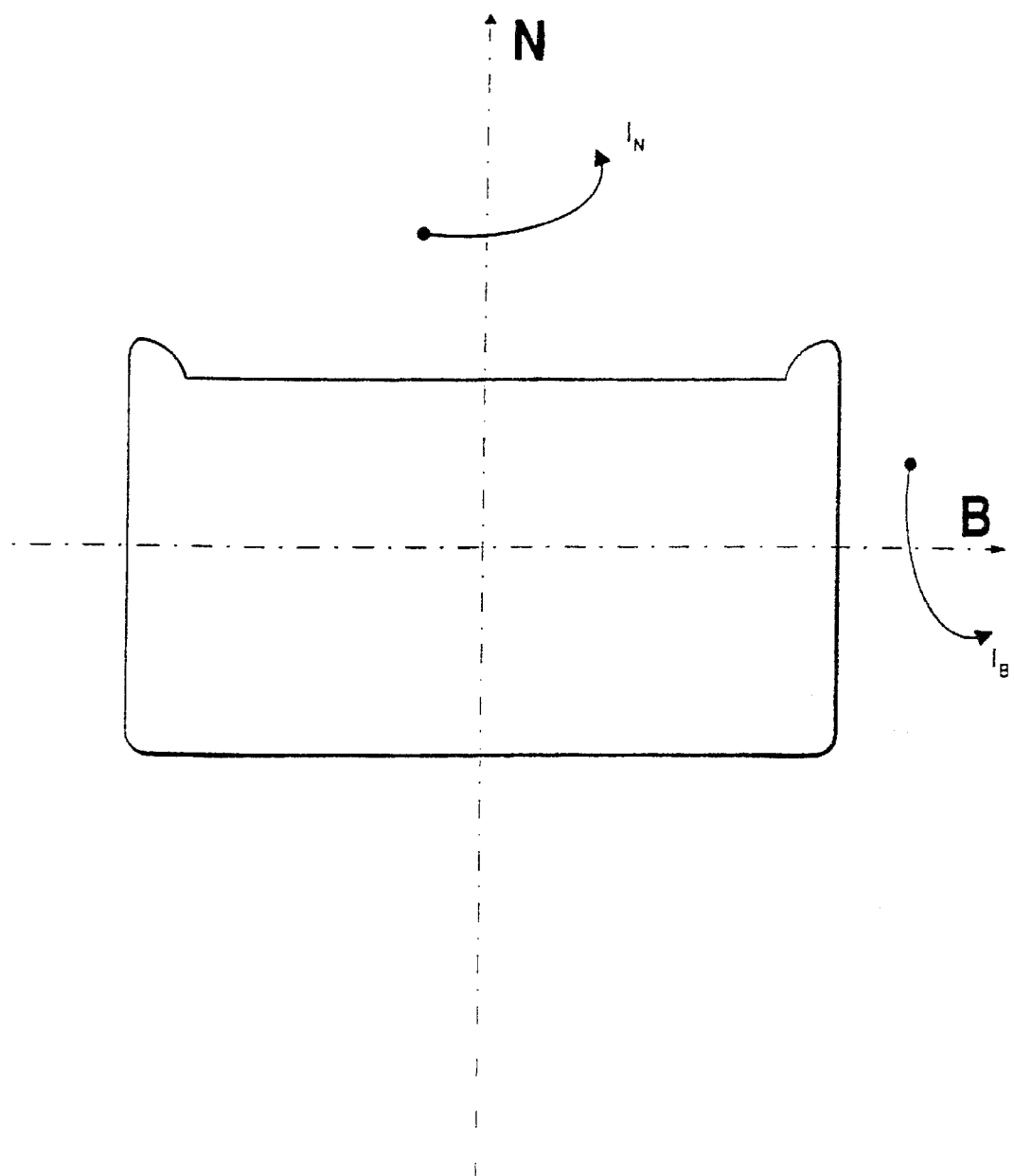
FIG. 5 shows the orientation of "C-shape" armour profiles with respect to the axis of symmetry of the pipe.

FIGS. 6–8 show representations of the component 10 which are used to make up layer pressure armour layer 3 when the optional layer of 4 is not used FIG. 2). Although the component 20, shown in FIG. 9, is preferably designed to engage with an inner winding 21, the component 20 could also be used in situations without an engaging inner winding 21. The outline of the components 10 or 20 can be roughly square (FIG. 7), or can be even more rectangular (FIG. 9) with the shorter sides parallel to the pipe axis of symmetry X—X.

The mechanism used to connect subsequent turns of a winding is the same for the situations in which a single winding is used, and also when both an inner 3 and outer 4 winding are used. The mechanism to connect these subsequent turns consists of a projection 8 which mates with a socket 9 in the next component turn. As shown in FIG. 8, more than one projection and corresponding socket can be used. Each projection has an enlarged head portion 11 connected to the body of component 10 by a narrow neck portion 12, and each socket has an enlarged portion 13 to receive the head portion 11 of the corresponding projection and a narrow opening 14 on which the neck 12 engages to hold the projection captive in the socket. The projections 8 and sockets 9 are dimensioned to allow a limited relative rotation between the adjacent turns of the winding and to resist separation, closing and relative radial movement of the respective turns. There are many possible variations in the design of the axial projection 8 and socket 9 arrangement but several critical functions, which are discussed below, will be enabled.

The effect of flexure on the conduit body is to produce local areas of tension and compression. An axial tension due to self weight will be superimposed on this. It may occur that in some applications, such as deep water, the pipe will see an axial compressive load. The primary function of the axial projection 8 and socket 9 locking mechanism is to resist local axial loading due to flexure, and so a component with this locking mechanism may have a substantial global tensile capacity. The geometry may be designed such that this capacity may be sufficient to support the self-weight of the pipe. This is enabled by designing the shape to have nearly vertical (radial) edges, as shown in FIG. 10 as A, which are optimal for resisting axial tension.

Similarly the almost vertical face, shown in FIG. 10 as B, is optimised to resist compression of the layer (as will occur in flexure). The transmission of radial contact pressure through the mechanism will occur along the areas shown as C in FIG. 10. This figure demonstrates two distinctive features of the invention. The contact pressure is transmitted over a finite area, regardless of the degree of flexure. Furthermore, the effects of the primary and secondary loading modes, that is internal pressure and flexure, are de-coupled. Therefore, they do not reach their maximum values at the same location, as was the case with previous profiles. In addition, it can be seen that the socket recess is reinforced by sufficient surrounding material to resist radial opening of the recess.

Ordinarily, the helically wound components are manufactured from ferrous metals, including stainless steels. The above mentioned feature of the invention may enable the safe use of higher strength steels (as an example, those with an Ultimate Tensile Strength greater than 800 MPa) in, for example the offshore recovery applications discussed earlier, as concerns about fatigue and fretting would be diminished.

By definition, a given force applied over a small area produces a higher pressure than the same force applied over a larger area. Thus, although in certain cases axial compression forces may be transmitted through the area B of FIG. 10, the preferred arrangement is such that the axial compression forces between adjacent turns of the winding are substantially transmitted through contact between radial sides of the component body, and not through contact between projection and socket. Accordingly, the length of the projection measured from its root, on one radial side of the body, is substantially shorter than the depth of the corresponding socket, measured from the opposing radial side of the body.

The capacity of the component to support high stress situations is partially dependent upon the relative area distributions of the elements which make up the component, and increases as the relative area defined by the projection is reduced. By definition, the cross sectional area encompassed by the component body excludes the area enclosed as the sockets, and any additional surface recesses (see later), but includes the area defined by the projections and also any fully enclosed internal cavities (see later). Therefore, as can be seen in FIGS. 7 and 9, the cross sectional area of each projection is substantially less than the cross sectional area of the component body excluding the area of each projection. Preferably, the cross sectional area of each projection should be less than 50% of the cross sectional area of the component body excluding the area of each projection, but in particular less than 30%.

By locating the projection 8 and socket 9 near the top of the component 10 or 20, and radially away from the axis of symmetry X—X of the flexible tubular conduit (FIGS. 7 and 9), the projections 8 and sockets 9 are located away from the areas of high stress. This also has the effect of reducing the gap between turns at the top of the component 10 or 20, which enables the use of a polymeric sealing layer on the outer surface of the component to seal against external pressure, and inherently reduces the load on the carcass layer 1. Thus, this may lead to a design of the flexible tubular conduit where no carcass 1 is required. Furthermore, this design should substantially increase the operating depth of flexible pipes offshore by reducing the weight per unit length ratio of the pipe and also enabling a much higher hydrostatic pressure to be carried.

The use of a locking mechanism formed by projection 8 and socket 9 located in the axial direction, gives the flexibility to change area distributions of the helically wound component, and thus is not reliant upon scaling a profile up or down. For a given load case, the pressure capacity of a layer, and thus the pipe, can be optimised by a user defined area distribution and not one reliant upon scaling a given profile up or down. As an example, for a very high pressure capacity, the component could be designed so as to have a second moment of area greater about the bi-normal axis (axial direction) than about the normal axis (radial direction), this difference being represented by FIGS. 7 and 9 where, by such an arrangement, the profile of the component shown in FIG. 9 has an inherently higher pressure capacity than that of the profile of the component shown in FIG. 7. This relative area distribution is also suitable for the inner winding 21.

The change in shape has the desirable effect of making the cross-sectional second moment of area about the bi-normal axis at least two thirds of, if not greater than, the second moment of area about the normal axis. These components may also be used as a carcass layer 1 inside the polymer sealing layer 2. This would substantially improve the collapse resistance of a flexible pipe by virtue of a controllable cross sectional flexural stiffness product of material Young's modulus and second moment of area). Furthermore, the lower stress regime incurred by these profiles increases the plastic collapse pressure of the layer, which in turn reduces the likelihood of failure.

If two layers of pressure armour are utilised (i.e. layers 3 and 4 of FIG. 2), the inner armour 3 profile may be adapted to minimise the gaps occurring between successive turns of armour. In this case, the profile of the component of the present invention for use as layer 3, is different from that described previously and consists of matching curves applied to the vertical faces (i.e. in the radial direction) of the profile, as illustrated by the mating faces 15 of the components shown FIG. 11. This enables the component to move with pipe flexure while minimising the aforementioned gap between turns of component.

An additional engaging arrangement comprising a projection 16 extending from the inner component 21 (FIG. 12), to engage in a recess or socket 17 located in the outer layer component 20, may be utilised (FIG. 13). Although the projection 16 is shown to emanate from component 21, the projection 16 could emanate from component 20 and engage with a corresponding socket 17 in the component 21. Some variations on the shape of the projection 16 are shown in FIG. 12, and it is clear that it may be rectangular (B), semi-circular (E) or hybrid (A, C, D, F) in shape. In addition, these engaging mechanisms are located centrally on the surfaces of the components so as to minimise the stress at the edges.

The additional socket 17 has a corresponding shape such that these adjacent components are allowed limited relative rotation and yet resist closing and relative radial movement. As an example, the projection 16 may comprise one or more flat head portions, which would avoid singular point contact, connected to the body of component 21 by inclined edges, which may be linear (FIG. 12, C) or curved (FIG. 12, F) or combinations of both (FIG. 12, A). Alternatively, the projection may comprise an enlarged head portion connected to the body of component 21 by a narrow neck portion (FIG. 12, D) and be dimensioned such that when engaged with the additional socket 17 of component 20, these adjacent components 20 and 21 are allowed limited relative rotation and yet resist separation, closing and relative radial movement.

The projection 16 will not only act to transfer radial contact pressure but also axial tension between the armour layers 20 and 21. As a result of flexural loading, the projection 16 must allow some rotation of the lower component 21 with respect to the upper component 20 but this has not been found to be severe, mainly due to the flexural limitations imposed by the polymeric layers in the pressure vessel structure.

As shown in FIG. 13, the connection mechanism 8 and 9 should be made in the upper layer (component 20). This ensures that the stress concentration, which is inevitable at the connection, acts in a region of lower mean stress than would otherwise be the case. FIG. 13 also shows fully enclosed internal cavities 25 which may be used, in one or more of the components, to reduce the weight of the pipe without substantially affecting the stress capacity.

It would be appreciated that many modifications to the above described embodiments of the invention may be made by someone skilled in the art, without departing from the scope of the invention. Furthermore, a version with a socket and/or projection (FIG. 14) coated with a material 26 to provide a sealing or lubricating layer would be a useful modification. A tubular braid 50 (FIG. 15) may also be applied to one or more windings to increase the axial tensile capacity of the pipe.

Other embodiments of the invention include the manufacture of the components from non-ferrous metals such as aluminum and its alloys, or nonmetallic materials including composite materials. In addition, the projection and socket mechanism may be coated with a lubricating material such as oils, waxes, greases or graphite. The projection and socket mechanism may also be coated with a sealing material, such as heavy hydrocarbons, including bitumen. Moreover, a polymeric (such as glass filled P.T.F.E) or elastomeric layer (such as polychloroprene, commonly known as Neoprene) may be applied to aid lubrication and/or sealing. The projections and/or sockets may also contain one or more surface recesses. Thus, the lubricating/sealing function can also be enabled by using specifically shaped strips which may be inserted into the surface recesses, or onto the surfaces of projection or socket. These modifications are equally suitable to all connection or engaging mechanisms of both inner and outer windings.

The method of mating subsequent turns of the component may be carried out using a press fit for steel components, as shown schematically in FIG. 16. Pressure is applied in the axial direction, by one or more rollers attached to the winding spindle, so as to force the projection 8 into its corresponding socket 9 in a continuous manner. Alternatively the strip may be manufactured with an open socket which is pressed shut during assembly, causing plastic deformation of at least the surrounding area (FIGS. 17 and 18). Compressive stresses would also be introduced which would increase the pressure capacity of the pipe.

The apparatus for constructing the present invention may be conveniently retrofitted to existing equipment used in the winding process. Two or preferably four diametrically opposite rollers would be used and these may be heated. In addition, heat treatments may be applied to the conduit to improve its mechanical properties.

In summary, unlike existing technology for helically wound reinforcement layers for flexible tubular conduits, this invention provides a locking mechanism located in the axial direction of the tubular conduit and thus gives the flexibility to change area distributions of the profiled components, and improve the mechanical performance of the tubular conduit without being reliant upon scaling a profiled component up or down.

In addition, the contact pressure is transmitted over a finite area, regardless of the degree of flexure of the tubular conduit. Furthermore, the loads due to internal pressure and flexure act at different points along the locking mechanism and thus do not reach their maximum value at the same location. Thus, the possibility of fatigue fracture and fretting is diminished, and the use of high strength steels is more attractive.

This invention also provides an arrangement which reduces the gaps which occur between engaging faces of a helically wound component, and thus increases the integrity of flexible tubular conduits. This is done by profiling the radial edges of the components such that they substantially mate even when the conduit is under flexure. Furthermore, this invention provides inner and outer windings which engage with one another and thus co-operate to reduce the effective maximum stress seen by either windings.

What is claimed is:

1. A flexible tubular conduit with a main conduit axis and having a reinforced wall structure comprising at least one component wound helically, the component comprising a body having one or more projections extending axially from one or both body sides and a corresponding number of sockets on the opposing body sides, the projections of one turn of the winding engaging in the sockets of the next turn of the winding, each projection having an enlarged head portion connected to the body by a narrow neck portion, and each socket having an enlarged portion to receive the head portion of the corresponding projection and a narrow opening on which the neck engages to hold the projection captive in the socket, the sockets and projections having dimensions to allow a limited relative rotation between the adjacent turns of the winding and to resist separation, closing, and relative radial movement of the respective turns, wherein the tubular conduit is configured to operate at pressures of greater than $50 \times 10^5$ N/m$^2$.

2. A flexible tubular conduit as claimed in claim 1, wherein the cross sectional area of each projection is substantially less than the cross sectional area of the component body excluding the area of each projection.

3. A flexible tubular conduit as claimed in claim 2, wherein the cross sectional area of each projection is less than 30% of the cross sectional area of the component body excluding the area of each projection.

4. A flexible tubular conduit as claimed in claim 2, wherein the cross sectional area of each projection is less than 20% of the cross sectional area of the component body excluding the area of each projection.

5. A flexible tubular conduit as claimed in claim 2, wherein the cross sectional area of each projection is less than 10% of the cross sectional area of the component body excluding the area of each projection.

6. A flexible tubular conduit as claimed in claim 1, wherein axial compression forces between adjacent turns of the winding are substantially transmitted through contact between radial sides of the component body and not through contact between projection and socket.

7. A flexible tubular conduit as claimed in claim 6, wherein the length of the projection, measured from its root on one radial side of the body, is substantially shorter than the depth of the corresponding socket, measured from the opposing radial side of the body.

8. A flexible tubular conduit as claimed in claim 1, wherein the socket recess is configured to resist radial opening of the recess.

9. A flexible tubular conduit as claimed in claim 8, wherein the socket recess is reinforced by sufficient surrounding material to resist radial opening of the recess.

10. A flexible tubular conduit as claimed in claim 1, wherein the tubular conduit is configured to operate at pressures of greater than $100 \times 10^5$ N/m$^2$.

11. A flexible tubular conduit as claimed in claim 1, wherein the tubular conduit is configured to operate at pressures of greater than $200 \times 10^5$ N/m$^2$.

12. A flexible tubular conduit as claimed in claim 1, wherein at least one projection and corresponding socket of the component are located at a position closer to the radially outer surface of the component than the radially inner surface.

13. A flexible tubular conduit as claimed in claim 1, wherein the component is characterised by a cross section whose second moment of area about the bi-normal (axial) direction is at least 20% of the second moment of area of the cross section about the normal (radial) direction.

14. A flexible tubular conduit as claimed in claim 1, wherein the component is characterised by a cross section whose second moment of area about the bi-normal (axial) direction is at least two thirds of, if not greater than, the second moment of area of the cross section about the normal (radial) direction.

15. A flexible tubular conduit as claimed in claim 1, wherein the component has one or more additional sockets or projections located in a surface facing radially inward and engaging with one or more corresponding projections or sockets on a second inwardly located helically wound component, thereby to locate the inner winding with respect to the outer winding and transmit radial forces, and resist relative axial sliding forces between the windings, whilst allowing some rotation of the inner winding with respect to the outer winding.

16. A flexible tubular conduit as claimed in claim 15, wherein the or each additional projections comprises an enlarged head portion connected to the body by a narrow neck portion, and the or each additional sockets has an enlarged portion to receive the head portion of the projections and a narrow opening on which the neck engages to hold the projections captive in the sockets, the additional sockets and projections having dimensions to allow a limited relative rotation between the adjacent second inner and first outer windings and to resist separation, closing, and relative radial movement of the respective windings.

17. A flexible tubular conduit as claimed in claim 1 wherein the projections and/or sockets are coated with a polymeric material, from a list including glass filled P.T.F.E, for the purposes of lubrication and/or sealing.

18. A method for constructing a flexible tubular conduit of the type claimed in claim 1, wherein each turn of the component is connected to an adjacent turn using a method of continuously linking the turns, by using the steps of applying pressure in a direction so as to force the projections into the adjacent sockets, followed by pressure in a further direction to substantially close the sockets onto the projections resulting in plastic deformation of at least the region around the socket, and providing compressive stresses in the component.

19. A method for constructing a flexible tubular conduit of the type claimed in claim wherein heated rollers are used to apply pressure.

* * * * *